US006865144B2

(12) United States Patent
Yanagisawa et al.

(10) Patent No.: US 6,865,144 B2
(45) Date of Patent: Mar. 8, 2005

(54) OPTICAL PICKUP APPARATUS AND TILT AMOUNT DETECTING METHOD

(75) Inventors: Takuma Yanagisawa, Tsurugashima (JP); Yoshitsugu Araki, Tsurugashima (JP); Takanori Maeda, Tsurugashima (JP); Masayuki Iwasaki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 634 days.

(21) Appl. No.: 09/921,308

(22) Filed: Aug. 3, 2001

(65) Prior Publication Data

US 2002/0048243 A1 Apr. 25, 2002

(30) Foreign Application Priority Data

Aug. 4, 2000 (JP) ........................................ 2000-237691

(51) Int. Cl.[7] .................................................. G11B 7/00
(52) U.S. Cl. .................................. 369/44.32; 369/53.19
(58) Field of Search ........................ 369/44.14, 44.23, 369/44.25, 44.26, 44.32, 44.41, 53.19, 53.35, 112.03, 112.04, 112.05, 124.1, 124.12, 275.4

(56) References Cited

U.S. PATENT DOCUMENTS

| 4,525,826 A | | 7/1985 | Nakamura et al. ............ 369/46 |
|---|---|---|---|
| 5,278,401 A | * | 1/1994 | Takishima et al. ........ 369/44.41 |
| 5,523,989 A | | 6/1996 | Ishibashi .................. 369/44.32 |
| 5,553,052 A | | 9/1996 | Oono et al. .................. 369/112 |
| 5,671,208 A | | 9/1997 | Park ............................ 369/112 |
| 6,507,544 B1 | * | 1/2003 | Ma et al. .................. 369/44.32 |
| 6,510,111 B2 | * | 1/2003 | Matsuura .................. 369/44.32 |
| 6,611,482 B2 | * | 8/2003 | Ma et al. .................. 369/53.19 |

FOREIGN PATENT DOCUMENTS

| EP | 0 749 116 A1 | 12/1996 | |
|---|---|---|---|
| EP | 0 944 052 A2 | 9/1999 | |
| EP | 0 953 974 A2 | 11/1999 | |
| JP | 11-110769 | 4/1999 | |
| JP | 11144281 A * | 5/1999 | ........... G11B/7/095 |
| JP | 2000-137923 | 5/2000 | |
| JP | 2000-149298 | 5/2000 | |

* cited by examiner

Primary Examiner—Thang V. Tran
Assistant Examiner—Bach Vuong
(74) Attorney, Agent, or Firm—Morgan, Lewis & Bockius LLP

(57) ABSTRACT

An optical pickup apparatus includes a photodetector for receiving a diffracted light reflected from the recording medium; and a tilt detector for detecting a tilt amount of the recording medium on the basis of a light intensity within an interference region of a 0th-order diffraction light and at least one diffraction light other than the 0th-order diffraction light of the reflected light received by the photodetector.

15 Claims, 18 Drawing Sheets

TPP14 = DET1 − DET4
TPP23 = DET2 − DET3

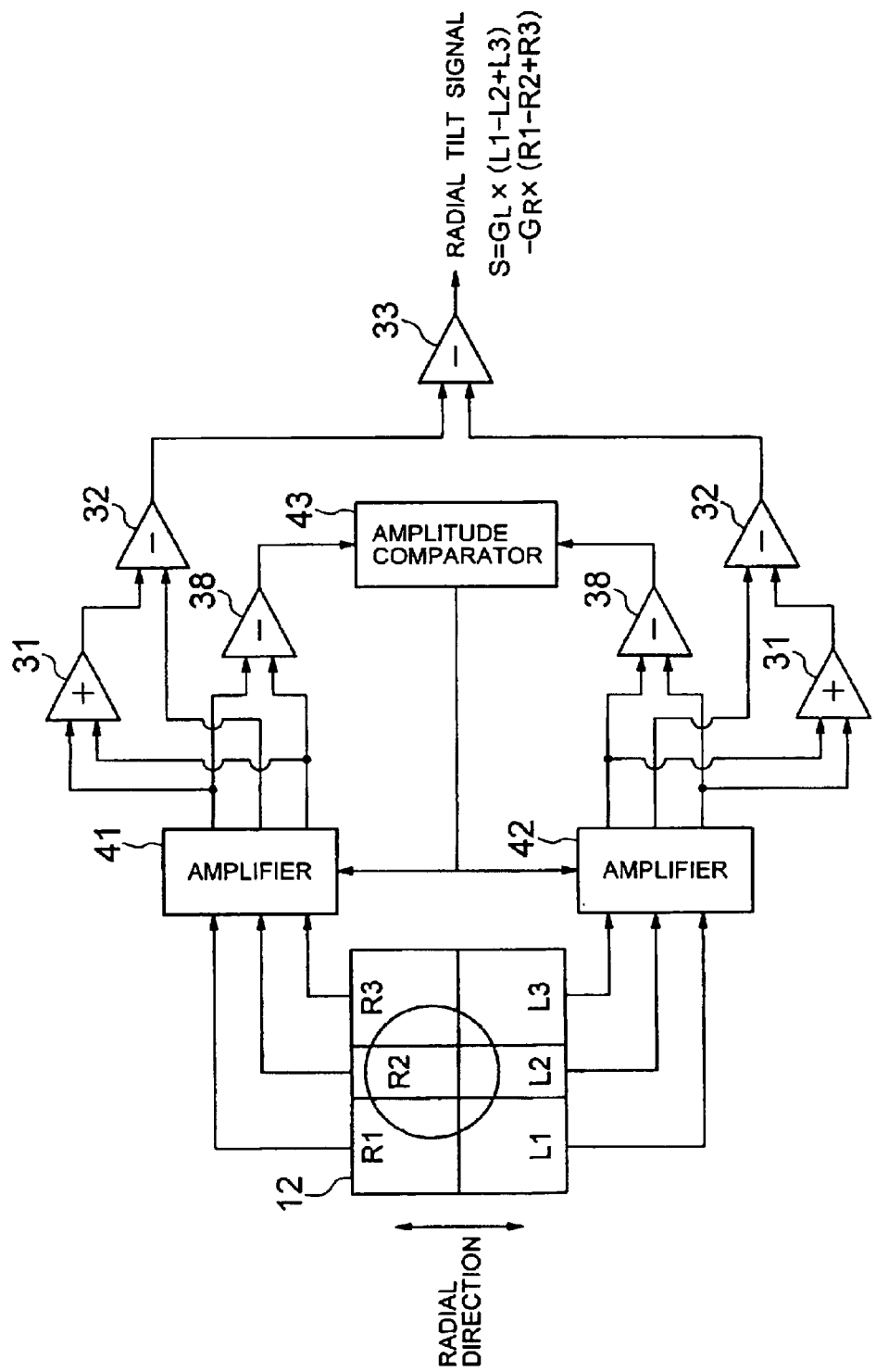

US 6,865,144 B2

OPTICAL PICKUP APPARATUS AND TILT AMOUNT DETECTING METHOD

BACKGROUND OF THE INVENTION

1. Field of the Invention

The present invention relates to an optical pickup apparatus for recording and/or reproducing information for use with a recording medium and, more particularly, to an optical pickup apparatus and a method for detecting a tilt amount of the recording medium.

2. Description of the Related Art

Various types of optical recording media are now under development such as a write-once DVD-R (Digital Versatile Disc—Recordable) a rewritable DVD-RW (DVD—Rewritable) and a DVD-RAM (DVD—Random Access Memory). The optical recording media have large recording capacities of, for example, several gigabytes.

An angular deviation usually occurs between the optical axis of a beam emitted from an optical pickup and the normal direction of the optical disc at an illuminated position due to warp of the optical disc when the optical disc is rotated during recording or reproduction in an optical disc recording/reproducing apparatus. The angular deviation, i.e., tilt angle, occurs mainly in a radial direction of the optical disc to produce a coma aberration in the optical system. Accordingly, the occurrence of the tilt angle produces signal deterioration such as crosstalk with the adjacent track or jitter, having adverse effects on the reproducing quality of the optical disc. Moreover, there is a need to decrease the laser wavelength and increase the numerical aperture NA of the objective lens in order to decrease the spot diameter of the laser beam, particularly in performing dense recording such as in a DVD. This causes a reduction of the margin for the tilt angle. Therefore, the increase of recording density makes it difficult to neglect the affect from the adjacent pit even if there is only a slight inclination of the optical disc, thus incurring deterioration in reproduction quality.

There is a need for a tilt signal to monitor a radial tilt amount when implementing a radial tilt-servo. However, the focus position of the optical pickup differs from a tilt position detected by the tilt sensor where providing a tilt sensor to detect a tilt amount separately from the information-recording/reproducing optical system. This results in drawbacks, such as difficulty in acquiring a correct tilt amount, increase of manufacturing cost and difficulty in size reduction. There are also various disadvantages including decreased detection accuracy resulting from aging of the tilt sensor. In an attempt to overcome such disadvantages, a variety of methods have been developed to detect a tilt amount without separately providing a tilt sensor.

Japanese Patent Application Laid-open No. H11-110769 discloses a conventional tilt servo device to detect a tilt amount without separately providing a tilt sensor. The tilt servo utilizes a difference in crosstalk amount between the adjacent tracks on the right and left of the track, thereby generating a radial tilt signal. This, however, requires a complicated circuit for detecting the crosstalk amount. Moreover, there is a need for saving the data of three rotations of the disc to the buffer to detect a crosstalk amount when using a one-beam optical pickup. There is also a necessity that the data has been already recorded in the one-beam optical pickup. Therefore, the applicability is limited only to the after-recording reproduction for a reproduction-only disc or a rewritable disc.

Japanese Patent Application Laid-open No. 2000-149298 discloses a tilt detecting method of generating a radial tilt signal by taking a difference between a DPP (Differential Push-Pull) tracking signal and a DPD (Differential Phase Detection) tracking signal. However, the groove recording on the CD-R or DVD-RW essentially requires a three-beam optical system. In addition, a pre-pit portion for indicating address information must be provided on the disc, since a DPD tracking signal should be acquired upon recording.

Furthermore, in a tilt detecting method disclosed in Japanese Patent Application Laid-open No. 2000-137923, a radial tilt signal is generated by monitoring a change amount in the signal reproduced from the same pre-pit arrays arranged to the right and left from a track center alike in the CAPA (Complementary Allocated Pit Address) of a DVD-RAM disc. However, this is applicable only for a disc wherein the same pre-pit arrays are provided. Accordingly, the method cannot be applied to a disk for reproduction only.

OBJECT AND SUMMARY OF THE INVENTION

The present invention has been made in view of the problems mentioned above, and it is an object of the present invention to provide a high-performance, reduced sized optical pickup apparatus broadly applicable to various discs and optical systems and capable of accurately detecting a tilt amount.

To achieve the object, according to one aspect of the present invention, there is provided an optical pickup apparatus for illuminating a recording surface of a recording medium with a light beam to record and/or reproduce information, which comprises a photodetector for receiving a diffracted light reflected from the recording medium; and a tilt detector for detecting a tilt amount of the recording medium on the basis of a light intensity within an interference region of a 0th-order diffraction light and at least one diffraction light other than the 0th-order diffraction light of the reflected light received by the photodetector.

According to another aspect of the present invention, there is provided a method of detecting a tilt amount of a recording medium for recording and/or reproducing information by illuminating a recording surface of the recording medium with a light beam, which comprises the steps of receiving a diffracted light reflected from the recording medium; and generating a tilt signal representing a tilt amount of the recording medium on the basis of a light intensity within an interference region of a 0th-order diffraction light and at least one diffraction light other than the 0th-order diffraction light of the reflected light received in the step of receiving.

BRIEF DESCRIPTION OF THE DRAWINGS

FIG. 17 is a block diagram of a modification to the third embodiment, showing an example of a configuration of a tilt-signal generating section using a six-element detector;

DETAILED DESCRIPTION OF THE PREFERRED EMBODIMENTS

Figure 1:
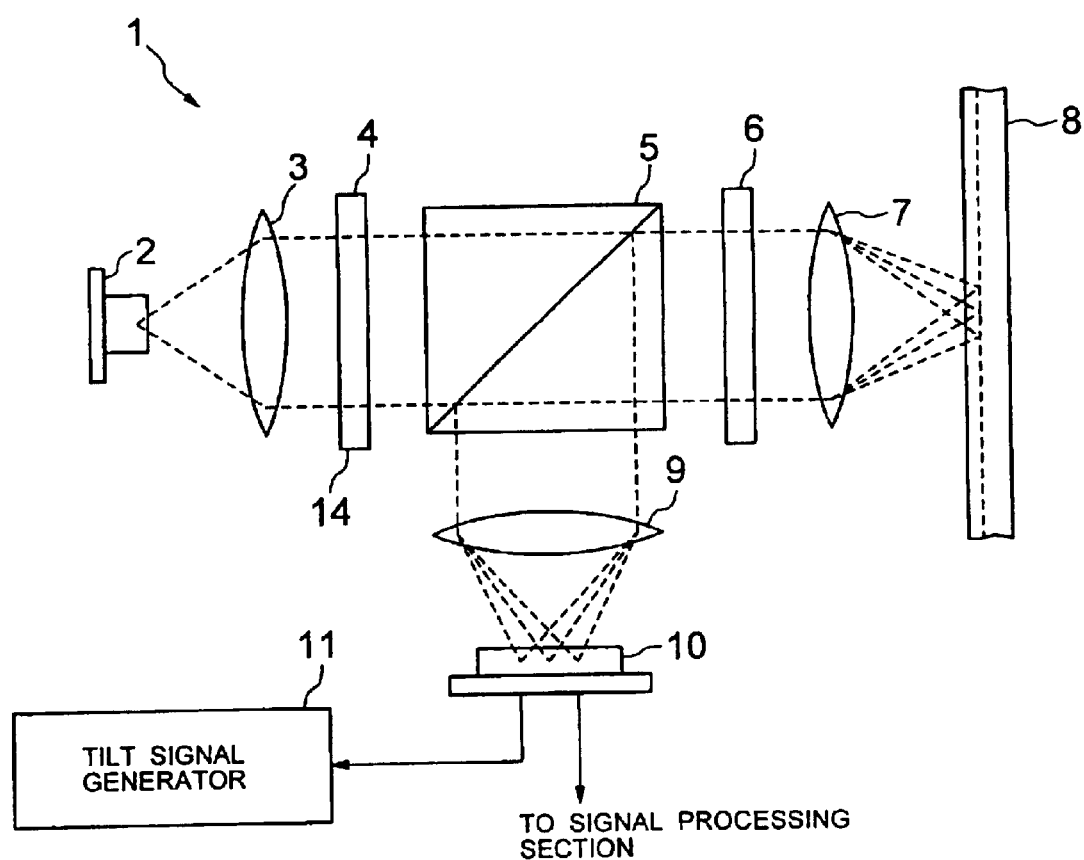
FIG. 1 is a figure schematically showing a configuration of an optical pickup apparatus according to the present invention.

The present invention will now be described in detail by way of embodiments, with reference to the drawings. It is noted that, in the figure described below, the same reference numerals denote substantially equivalent constituent elements.

First Embodiment

FIG. 1 is a figure schematically showing a configuration of an optical pickup apparatus according to the present invention. A laser light emitted from a light source 2 is collimated through a collimator lens 3 and is incident on a diffraction grating 4. The diffraction grating 4 splits the laser beam into a main beam BM and first and second sub-beams BS1, BS2. In other words, the optical pickup apparatus has a three-beam configuration. The beams BM, BS1, BS2 are transmitted through a beam splitter 5 and pass through a $\lambda/4$ wavelength plate 6 so that the beams are focused in the form of circularly polarized beams through an objective lens 7, thus illuminated onto an optical disc 8. The beam reflected from a recording surface of the optical disc 8 is passed through the objective lens 7, a $\lambda/4$ wavelength plate 6 and the beam splitter 5 and focused by a focus lens 9, and then detected by a detector 10. The reception-light signals of the beams BM, BS1, BS2 detected by the detector 10 are supplied to a signal processing section (not shown), and to a tilt-signal generating section 11 for generating a tilt signal due to the detection of a tilt amount from the reflection beam on the optical disc 8 as described below. It is noted that the signal processing section not only generates a readout-data signal but also performs signal processing for tracking and focus control.

Figure 2:
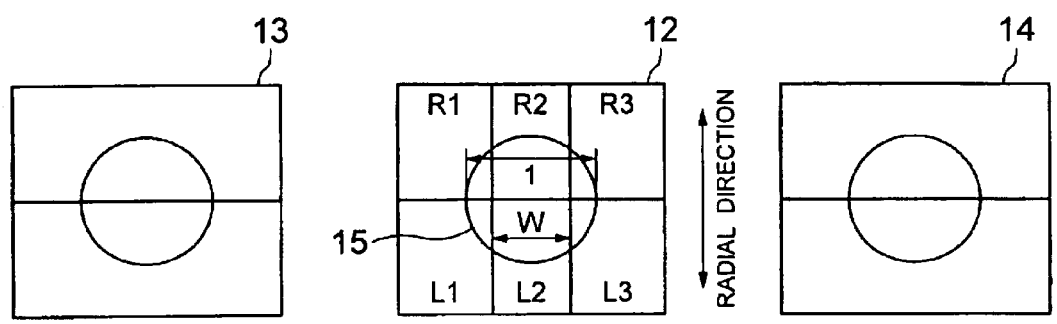
FIG. 2 shows a configuration of a detector of the optical pickup apparatus of FIG. 1.

FIG. 2 shows a configuration of the detector 10. The detector 10 includes a center-detector 12 for the main-beam and two side-detectors 13, 14 for the sub-beams. The center-detector 12 is a six-element detector having six photo-detecting elements. The six photo-detecting elements are arranged in the regions of the center-detector 12 obtained by two-division or two-partitioning of the detector area in a radial direction of the optical disc 8 and a further three-division of the area in a tangential direction of the disc 8. In other words, the six photo-detecting elements of the center-detector 12 are arranged in a two by three matrix configuration. Two sets of the three-element sections (i.e., R1–R3 and L1–L3) are arranged in the radial direction of the recording medium as shown in FIG. 2. The center detector 12 detects a beam spot 15.

As shown in FIG. 2, the photo-detecting elements in one of the opposed two sets in a radial direction are denoted, respectively, as L1, L2 and L3 in the order with respect to a tangential direction. Those of the other set are represented as R1, R2 and R3. Incidentally, in the following description, the detection signals by the photo-detecting elements are also described using the same reference numerals L1–L3, R1–R3 for the convenience of description. The center detector 12 is divided with a division width such that the photo-detecting elements L2 and R2 at the center are given a width (W) of 0.6 (i.e., W=0.6) provided that the beam spot has a diameter of 1. The value W may be selected an optimal value for the device used, because it is varied depending on the numerical aperture NA of the objective lens 7, the wavelength $\lambda$ of the light source, the track pitch (groove pitch) and the like.

Figure 3:
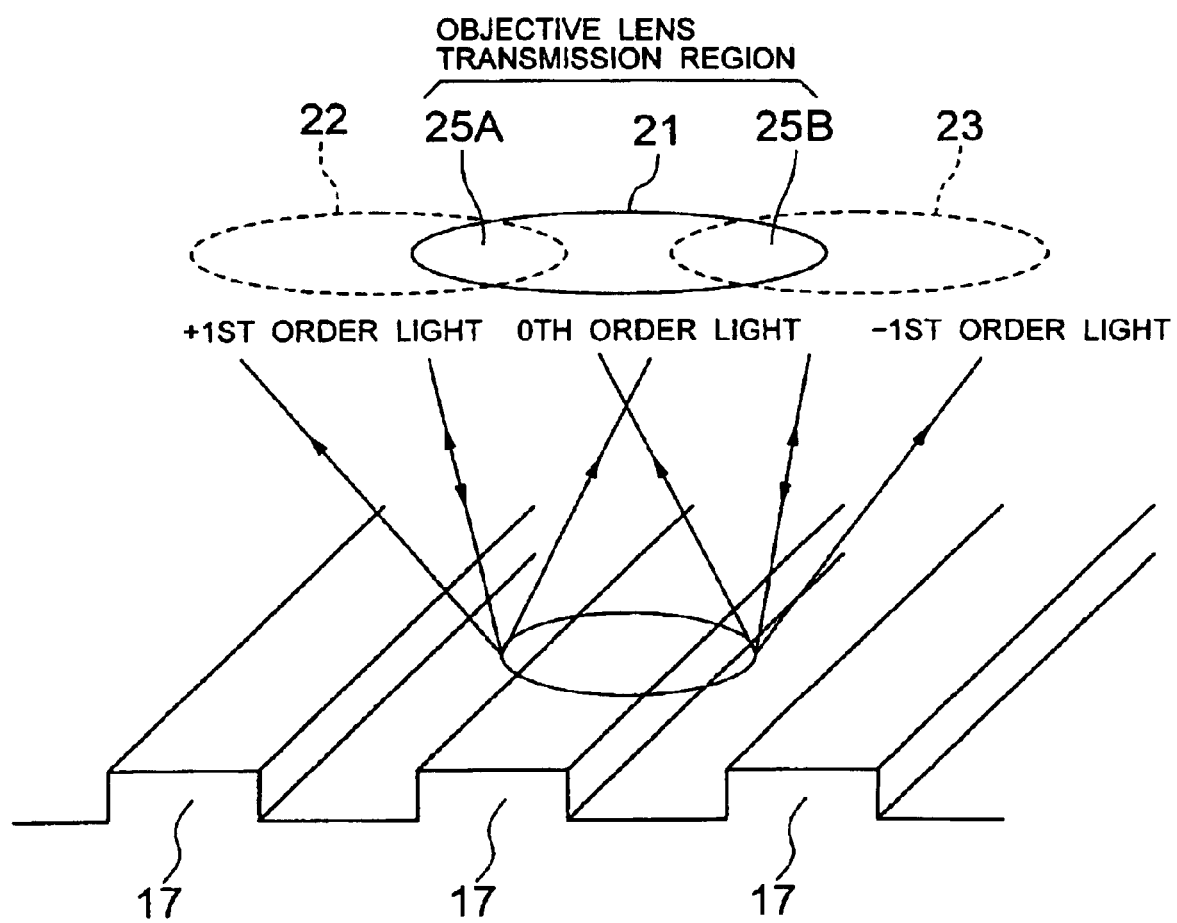
FIG. 3 is a perspective view schematically showing 0th-order diffraction light and ±1st order diffraction light of the beam illuminated to the optical disc.

For the usual optical disc, the groove or track pitch is set tot be $\lambda/(2\times NA)$ or more. In such a case, the beam illuminated to the optical disc is diffracted by the groove 17 or data recording area and split into, at least, 0th-order diffraction light 21, +1st order diffraction light 22 and −1st order diffraction light 23 as shown in FIG. 3. The diffracted lights are partly overlapped on the light path, thereby causing an interference region 25. More specifically, there is produced an interference region 25A due to the 0th-order diffraction light 21 and the +1st order diffraction light 22 as well as an interference region 25B due to the 0th-order diffraction light 21 and the −1st order diffraction light 23.

Figure 4:
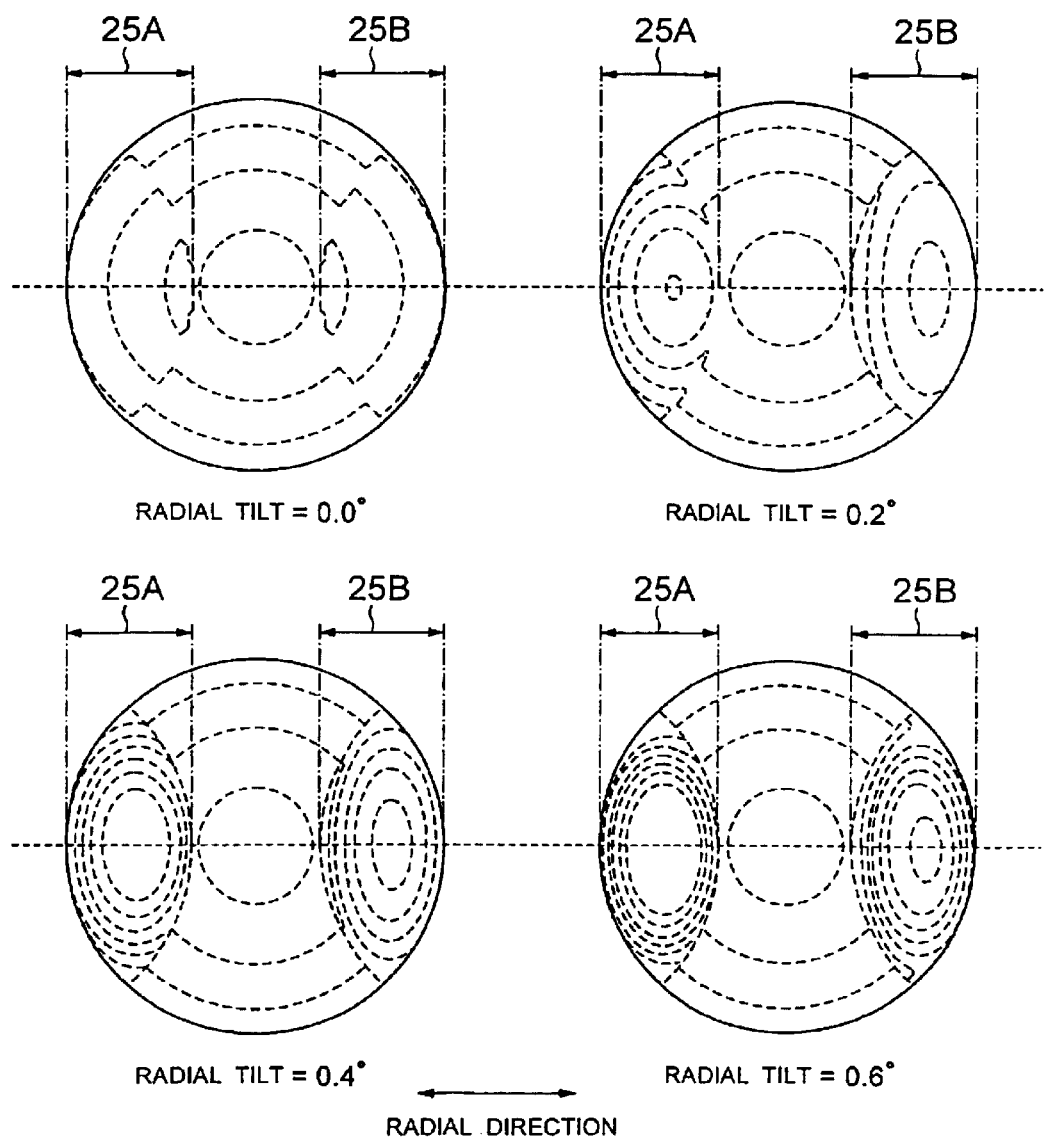
FIG. 4 shows a distribution of beam spot intensity on a center detector when a radial tilt occurs.
Figure 5:
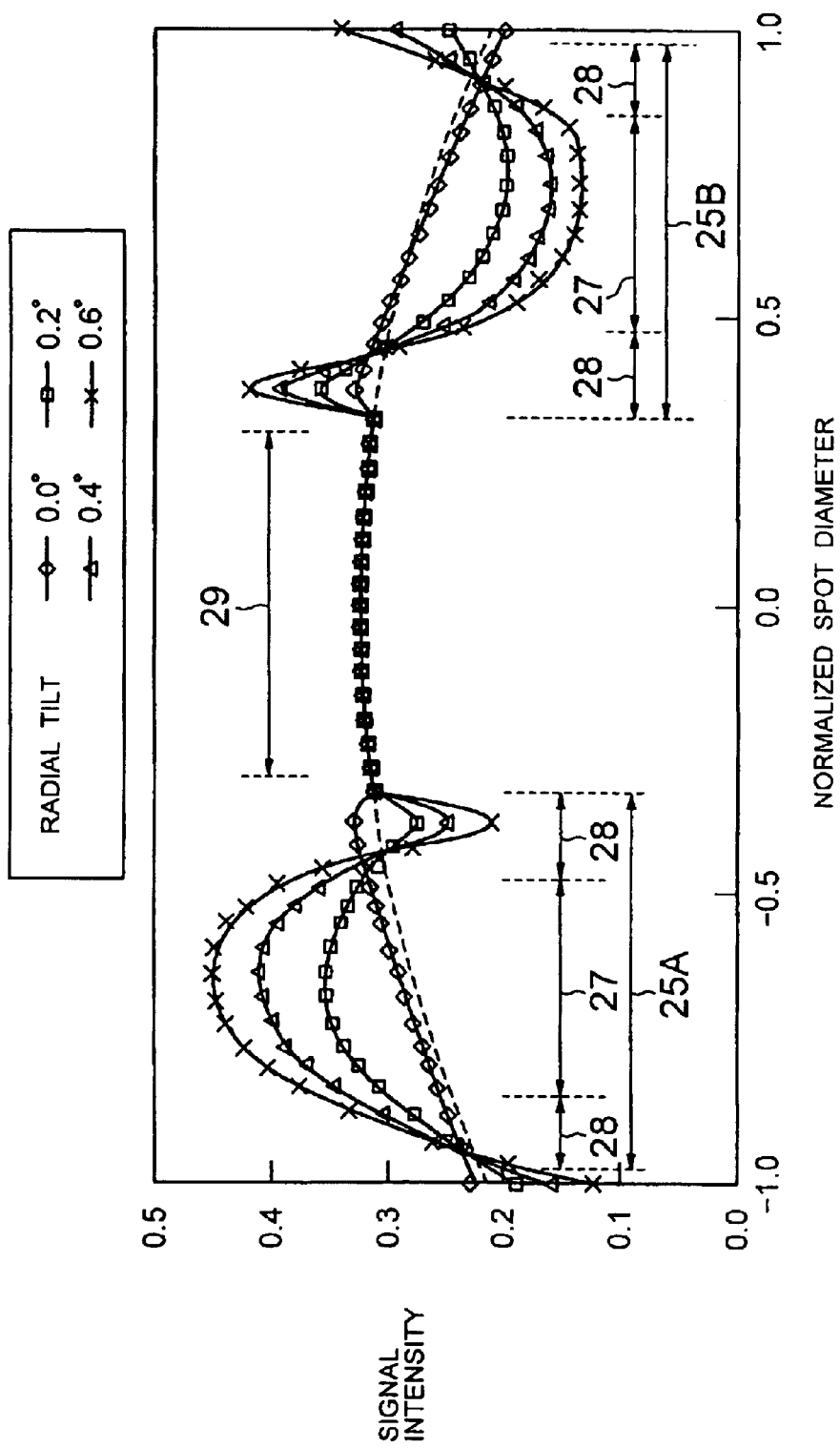
FIG. 5 shows a light intensity distribution, shown by the broken line in the light intensity distribution in FIG. 4, on a section passing a detector center and in parallel with the radial direction, against a relative spot diameter normalized of the spot diameter.

FIG. 4 shows beam-spot intensity distributions on the center detector 12 for radial tilts of 0°, 0.2°, 0.4° and 0.6° due to the illumination beam on the groove 17 at the time of recording or reproduction. FIG. 5 shows light intensity distributions on a section passing the detector center and parallel with the radial direction (shown by the broken line in FIG. 4), against a relative spot diameter wherein the spot diameter is normalized to 1. As will be understood from FIG. 5, the difference of diffraction-light intensity increases in between the inner peripheral area 27 and the outer peripheral area 28 of the interfering region as the radial tilt increases. Therefore, a radial tilt amount can be known by monitoring the difference of light intensity in between the inner peripheral area 27 and the outer peripheral area 28. Or otherwise, it is possible to know a radial tilt amount by detecting a difference of light intensity in between either of the inner peripheral area 27 and the outer peripheral area 28 and another area, e.g. the spot center 29.

Figure 6:
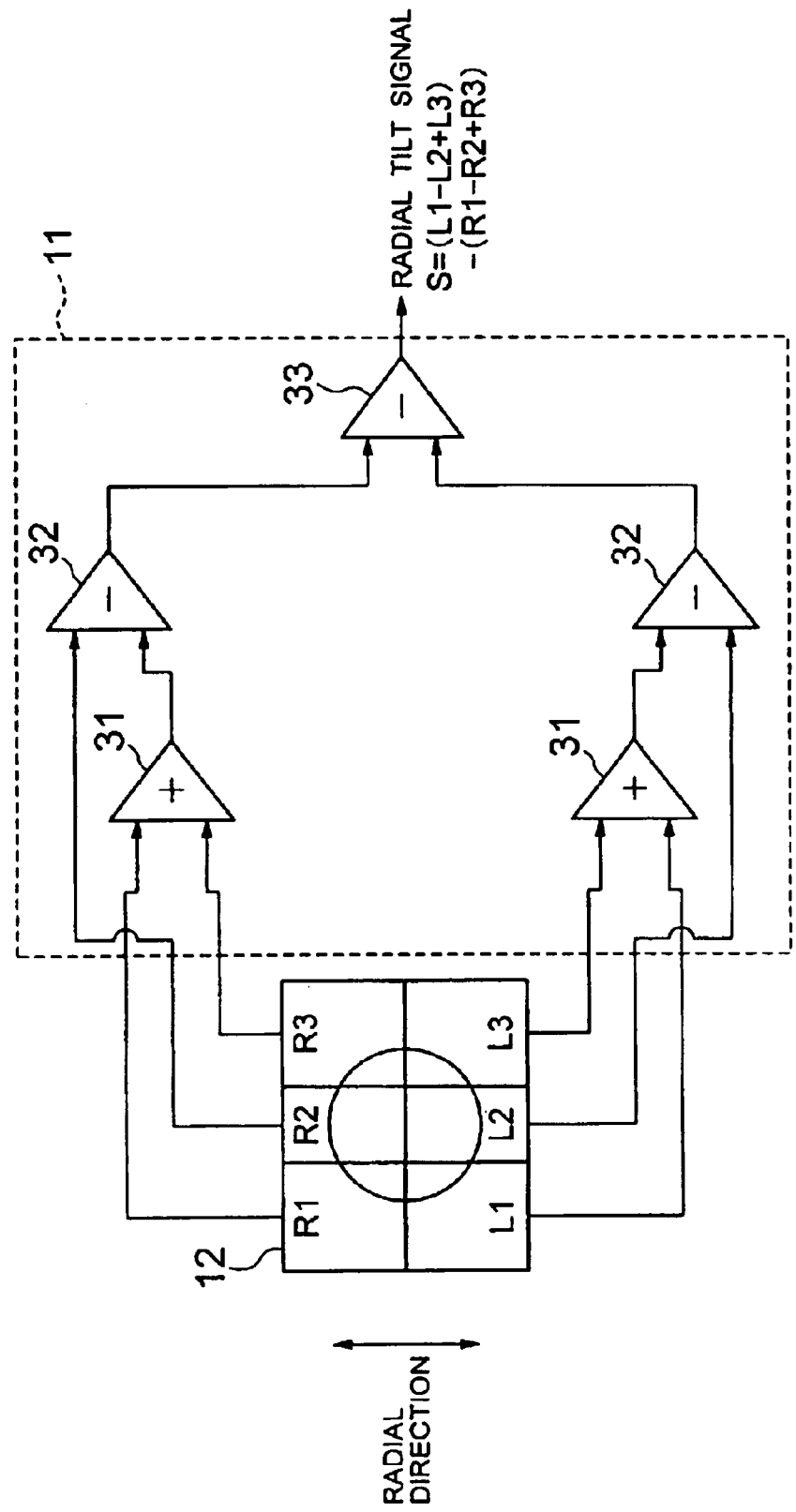
FIG. 6 is a block diagram showing an example of a configuration of a detector and a tilt-signal generating section.

FIG. 6 is a block diagram showing an example of a configuration of the detector 12 and the tilt-signal generating section 11. The detector 12 is a six-element detector as described above. Among the signals detected by three photo-detecting elements R1–R3 arranged in the tangential direction of the optical disc 8, the detection signals R1 and R3 are supplied to an adder 31 where they are added together. The addition signal (R1+R3) and the detection signal R2 are supplied to a subtracter 32. The detection signal R2 is subtracted from the addition signal (R1+R3), to supply a subtraction signal (R1−R2+R3) to an adder 33. The detection signals L1–L3 of the other set are subjected to similar operation, to supply a subtraction signal (L1−L2+L3) to the subtracter 33. In the subtracter 33, the subtraction signal (R1−R2+R3) is subtracted from the subtraction signal (L1−L2+L3), to obtain the following as a radial tilt signal.

$$S=(L1-L2+L3)-(R1-R2+R3) \quad (1)$$

In this case, the radial tilt amount is detected on the basis of the difference of light intensity in between the inner peripheral area 27 and the outer peripheral area 28 of the interfering region 25.

Figure 7:
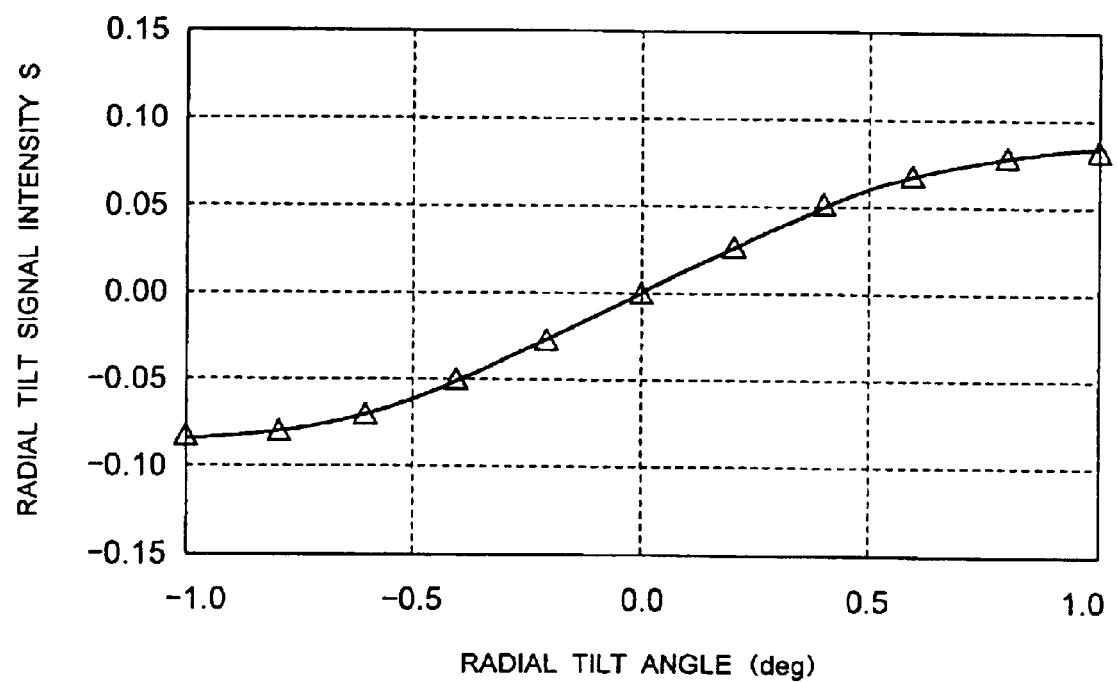
FIG. 7 is a figure plotting a radial tilt signal intensity S against a radial tilt angle in a first embodiment of the present invention.

FIG. 7 shows a result of plotting of a radial tilt signal intensity S as a function of the radial tilt angle. The radial tilt signal S intensity monotonously varies in accordance with the radial tilt angle. It is accordingly understood that favorable tilt servo control is possible by using the radial tilt signal intensity S obtained in the above method. Herein, the tracking servo control performed in this case used Pr=(L1+L2+L3)−(R1+R2+R3) as a radial push-pull signal. It is also assumed that data is not recorded on the optical disc. Incidentally, for an optical disc on which data is recorded, an RF signal component is contained in the detection signal. However, because the Rf signal component can be removed by a low-pass filter, it is possible to obtain a radial tilt signal S similar to the above.

Both of L1 through L3 and R1 through R3 are used in the embodiment. However, either one of S=L1−L2+L3 and S=R1−R2+R3 may be used.

Second Embodiment

Described below is a radial tilt signal for the present embodiment in the presence of an optical axis deviation, prior to describing a tilt detecting method of a second embodiment of the invention which is particularly effective in the presence of the deviation.

Figure 8:
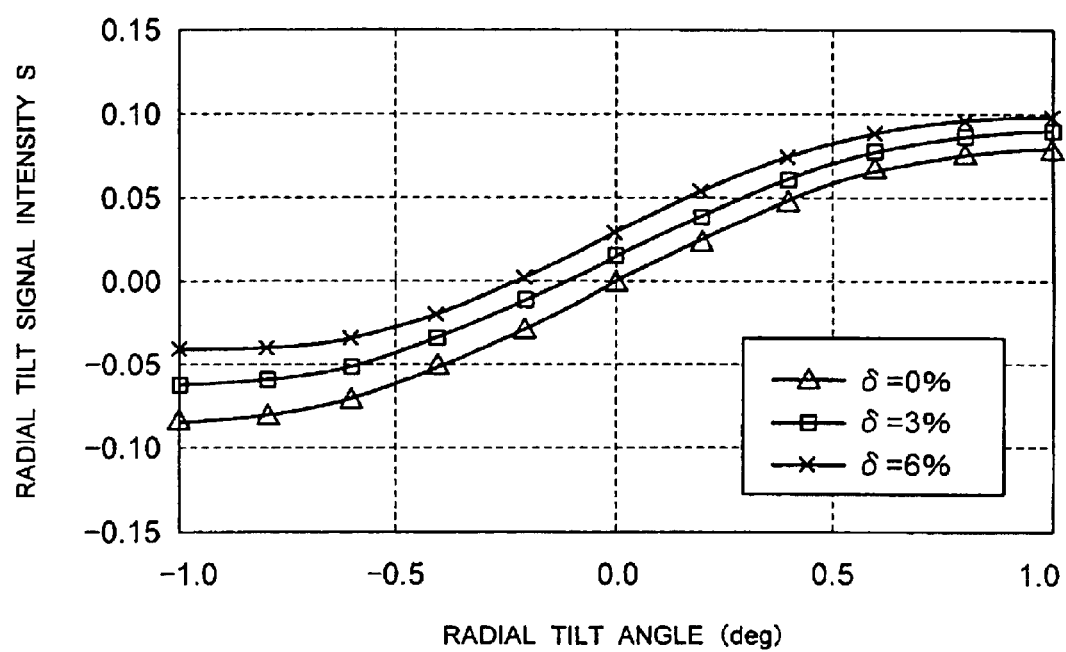
FIG. 8 is a figure showing a simulation result on a radial tilt signal intensity in the presence of an optical axis deviation ($\delta$)

In the usual optical pickup apparatus, the objective lens is deflected in the radial direction by way of a tracking servo when there is an eccentricity in the disc. As a result, the spot on the detector will shift in the radial direction, thus an optical-axis deviation (δ) will occur. FIG. 8 shows a result of a simulation on the radial tilt signal intensity in the presence of an optical-axis deviation (δ). In this case, a DPP (Differential Push-Pull) tracking signal was used in order to cancel the tracking offset due to an optical axis deviation.

FIG. 8 shows the radial tilt signal intensity S against the radial tilt angle for optical-axis deviations of 0, 3 and 6%. It can be seen that the radial tilt signal does not take 0 in spite of a radial tilt of zero. In other words, an intensity offset will occur in the radial tilt signal.

Figure 9:
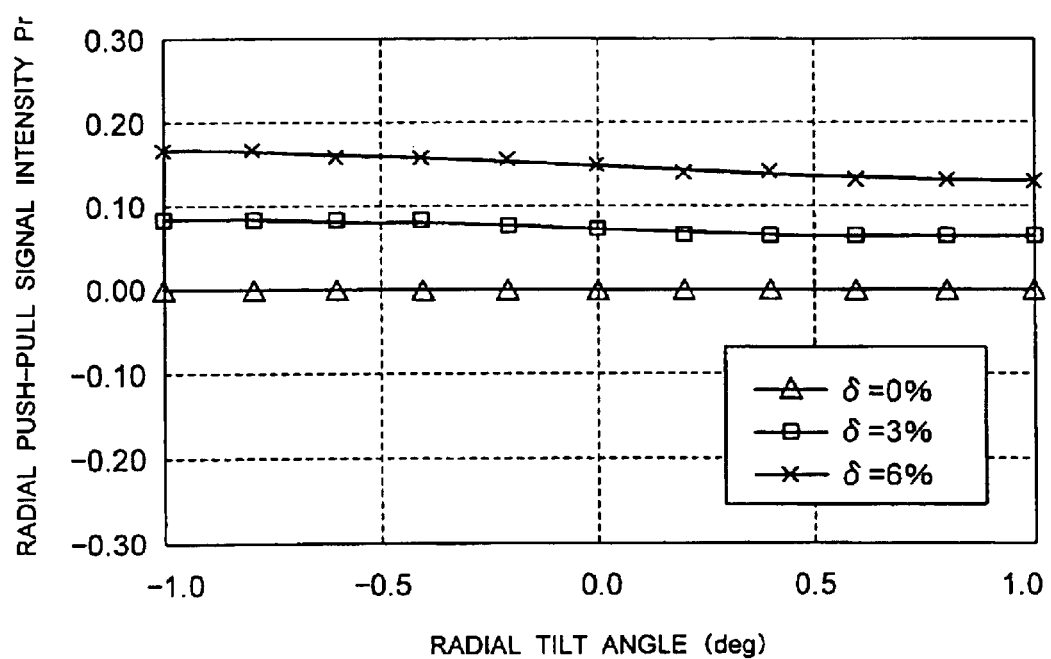
FIG. 9 is a figure showing a simulation result on radial push-pull signals Pr for optical axis deviations ($\delta$) of 0, 3 and 6%.

FIG. 9 shows a result of simulation of radial push-pull signals Pr against optical-axis deviations (δ) of 0, 3 and 6%. It is to be understood from FIG. 8 and FIG. 9 that there is nearly a proportional relationship between an offset amount of the radial tilt signal and a magnitude of the radial push-pull signal Pr. Accordingly, the offset caused due to the optical-axis deviation (δ) in the radial tilt signal can be corrected by correcting the radial tilt signal S=(L1−L2+L3)−(R1−R2+R3), which is described in the first embodiment, with the radial push-pull signal Pr=(L1+L2+L3)−(Ri+R2+R3). The radial tilt signal S' after the correction can be expressed by the following equation.

$$S'=(L1-L2+L3)-(R1-R2+R3)-\alpha \times Pr \quad (2)$$

where, α is a predetermined correction coefficient.

Figure 10:
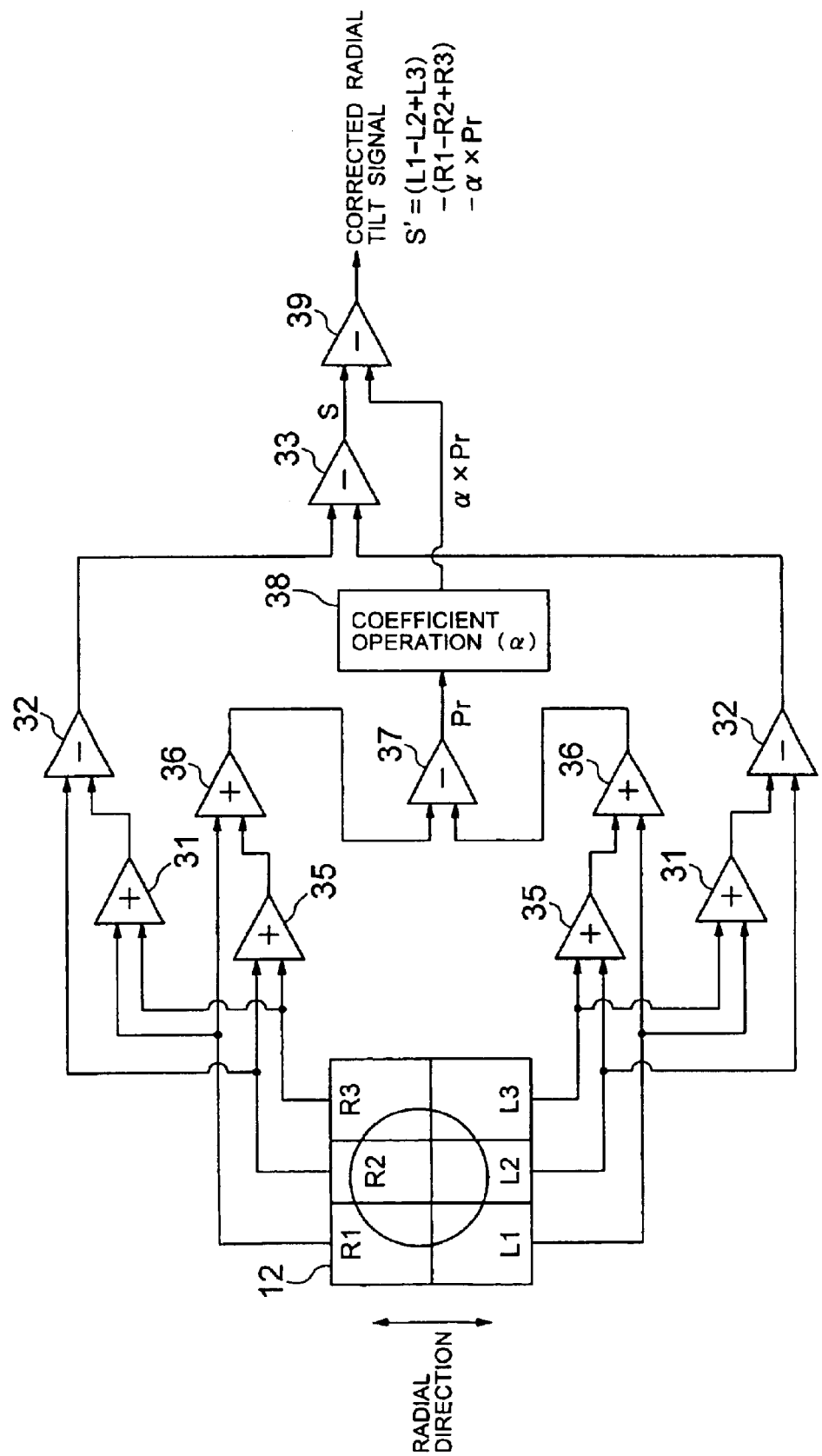
FIG. 10 is a block diagram showing an example of a configuration of a detector and a tilt-signal generating section in a second embodiment of the present invention.

A block diagram of FIG. 10 is shown as an example of a tilt detector 12 and a tilt-signal generating section 11 for carrying out the tilt detecting method of the second embodiment of the invention. It is noted that the configuration of the detector 12 is similar to that of the first embodiment.

The detection signals R1, R2, R3, detected by the three photo-detecting elements R1–R3 arranged in the tangential direction of the optical disc 8, are operated by an adder 31 and subtracter 32 in a similar manner to the first embodiment. The obtained signal (R1−R2+R3) is supplied to a subtracter 33. The detection signals L1, L2, L3, detected by the photo-detecting elements L1–L3 tangentially arranged in the other sets, are also operated by the adder 31 and subtracter 32. The obtained signal (L1−L2+L3) is supplied to the subtracter 33. In the subtracter 33, a radial tilt signal S=(L1−L2+L3)−(R1−R2+R3) can be obtained.

On the other hand, the detection signals R1, R2, R3, L1, L2, and L3 are operated by adders 35, 36 and subtracter 37. A radial push-pull signal Pr=(L1+L2+L3)−(R1+R2+R3) is supplied from the subtracter 37 to a coefficient operator 38. In the coefficient operator 38, the radial push-pull signal Pr is multiplied by a correction coefficient (α). In a subtracter 39, a correction value α×Pr is subtracted from the radial tilt signal S, thereby obtaining a corrected radial tilt signal S'={(L1−L2+L3)−(R1−R2+R3)}α×Pr.

Figure 11:
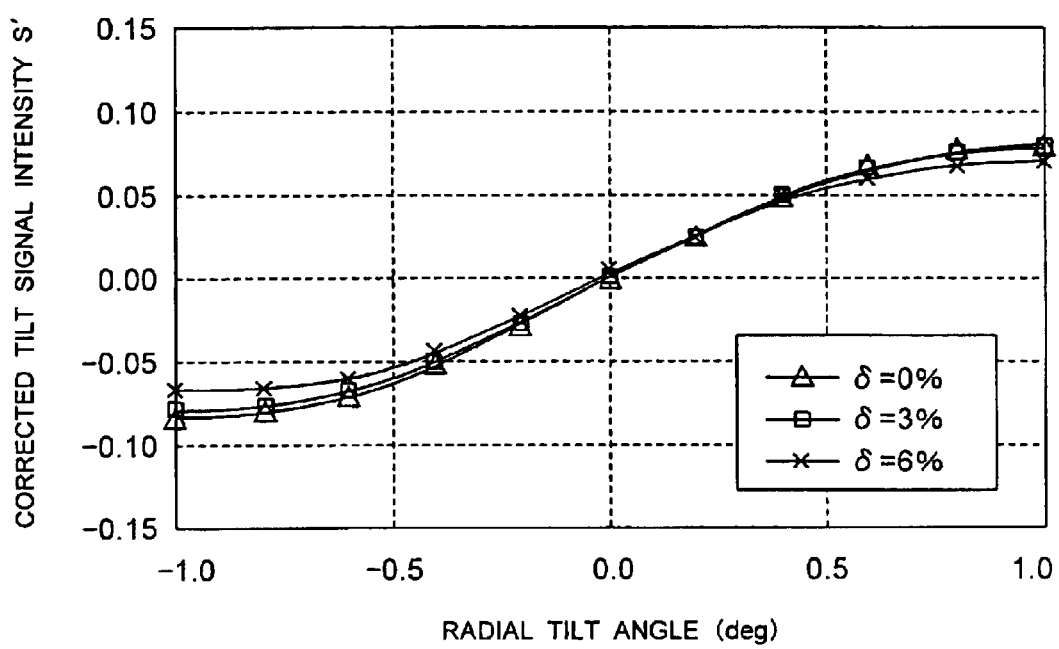
FIG. 11 is a figure plotting a corrected radial tilt signal intensity S' against a radial tilt angle with parameters of optical axis deviations $\delta$=0, 3 and 6% in the second embodiment of the present invention.

FIG. 11 shows an intensity plot of corrected radial tilt signals S' against radial tilts with the parameters of optical-axis deviations δ=0, 3 and 6% when the tilt detecting method described above is performed. Even where an optical-axis deviation (δ) occurs, the corrected radial tilt signal intensity S' is free of offset. Accordingly, it is to be understood that favorable tilt servo control is feasible by using a corrected radial tilt signal intensity S' obtained in the above method.

Although the tracking servo using the DPP signal was shown, similar effects are obtained by a three-beam method. Also, although the correction coefficient α=0.2 was given herein, the correction coefficient may be properly determined depending on the design of an optical system used, the disc type and the like. Furthermore, the present method is applicable also to an optical pickup having a one-beam configuration because a tracking servo can be executed with a DPD signal upon reproduction.

Third Embodiment

In addition to the foregoing embodiments, the offset caused in the radial tilt signal by optical-axis deviation can be canceled by another method. In a third embodiment of the present invention, a radial tilt signal is acquired by using a tangential push-pull signal. In advance of describing a tilt detecting device of the third embodiment of the invention, description is made below on the relationship between a tangential push-pull signal and an optical-axis deviation.

Figure 12:
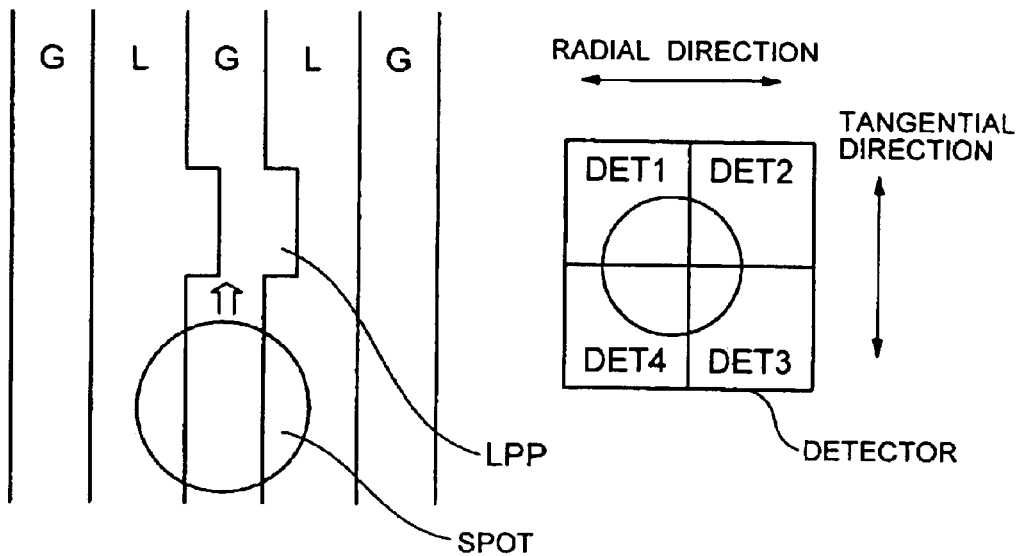
FIG. 12 is a figure showing the lands (L), the grooves (G) and an illumination beam spot in a recording area on the optical disc, and a detector.
Figure 13:
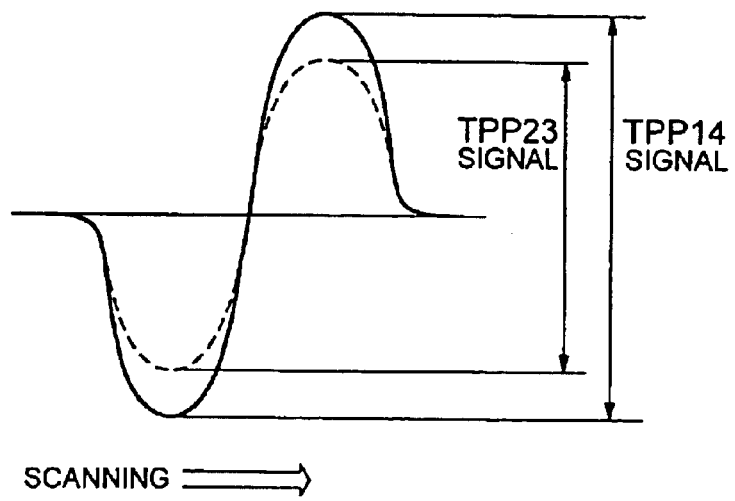
FIG. 13 is a figure showing amplitudes of tangential push-pull signals TPP14 and TPP 23 where there is an optical axis deviation ($\delta$) in the case of FIG. 12.

FIG. 12 shows lands (L), grooves (G) and an illumination-beam spot on a recording area of the optical disc 8, together with a detector. The detector is exemplified by a four-element detector (quadrant photodetector), for simplification of description. The scanning of an optical beam over a land prepit (LPP) provides the amplitudes TPP14 (i.e. TPP14=DET1−DET4) and TPP23 (i.e. TPP23=DET2−DET3) of a tangential push-pull signal as shown in the figure. However, there is a difference between the tangential push-pull signal amplitudes TPP14 and TPP23 as shown in FIG. 13 when there is an optical-axis deviation (δ). The effect of optical-axis deviation is removed by the use of a tangential push-pull signal in the embodiment.

Figure 14:
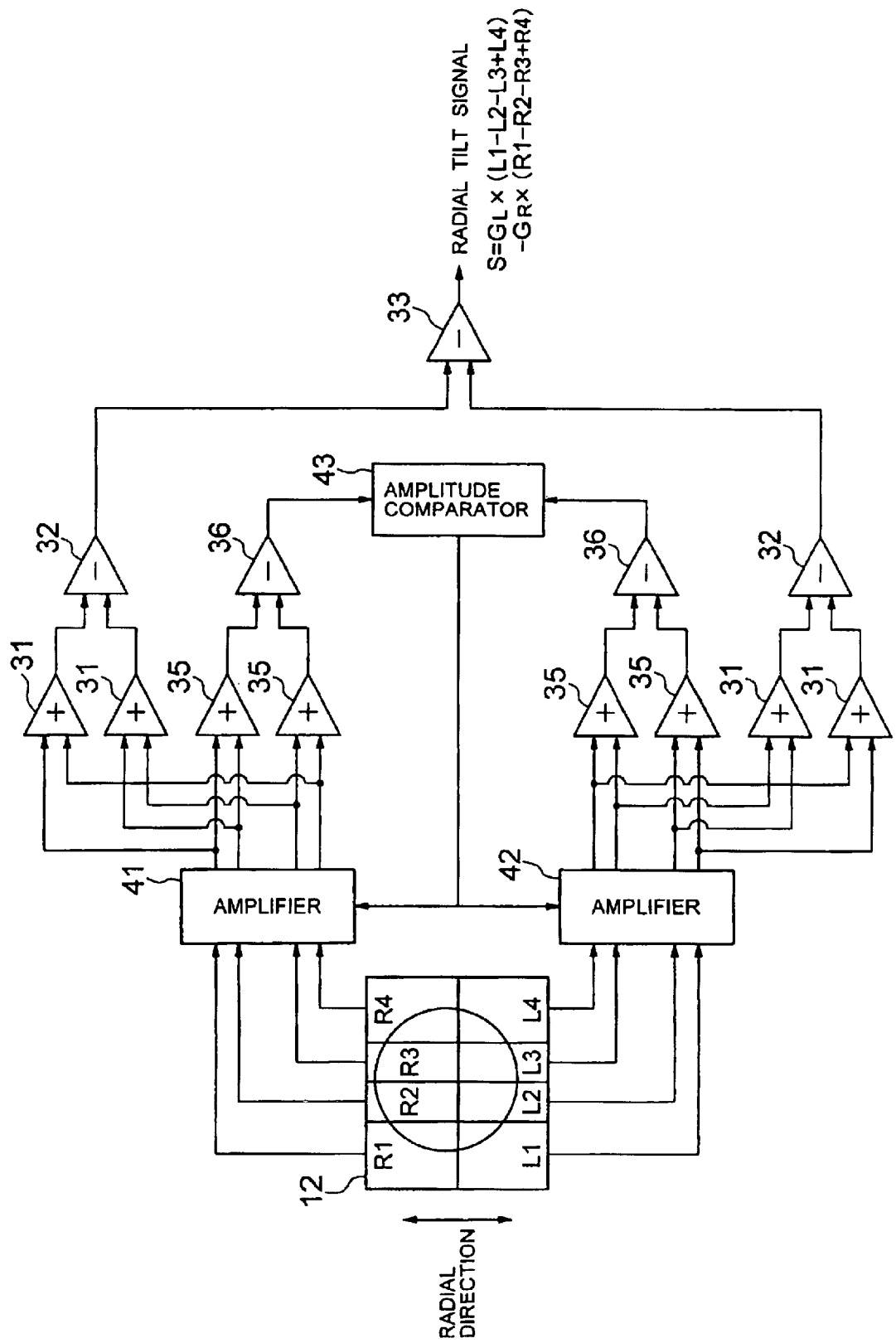
FIG. 14 is a block diagram showing an example of a configuration of a detector and a tilt-signal generating section in a third embodiment of the present invention.

FIG. 14 is a block diagram showing an example of a configuration of a detector 12 and a tilt-signal generating section 11 of a third embodiment of the invention. The detector 12 is an eight-element detector having eight photo-detecting elements arranged in the regions obtained by dividing two and four in the radial direction and the tangential direction, respectively, of the optical disc 8.

The detection signals R1, R2, R3 and R4, detected by the four photo-detecting elements R1–R4 arranged in the tangential direction of the optical disc 8, are amplified by an amplifier 41 having an amplitude gain $G_R$. The amplified signals are operated by adders 31 and a subtracter 32 similar to the first embodiment. The obtained signal $G_R \times (R1-R2-R3+R4)$ are supplied to a subtracter 33. Also, the amplified signal are operated by an adder 35 and subtracter 36. The obtained signal $G_R \times (R1+R2-R3-R4)$ is supplied to an amplitude comparator 43.

On the other hand, the detection signals L1, L2, L3 and L4 of the other set are also amplified by an amplifier 42 having an amplitude gain $G_L$, and then subjected to the process similar to the above. The obtained signal $G_L(L1-L2-L3+L4)$ is supplied to the subtracter 33 while the signal $G_L \times (L1+L2-L3-L4)$ is supplied to the amplitude comparator 43.

The amplitude comparator 43 supplies a signal for adjusting the amplitude gains $G_R$ and $G_L$ of the tangential push-pull signal amplitudes $PT_R(=R1+R2-R3-R4)$ and $PT_L(=L1+L2-L3-L4)$ to the amplifiers 41 and 42, to perform control so as to substantially equalize $G_R \times (R1+R2-R3-R4)$ and $G_L \times (L1+L2-L3-L4)$. This makes it possible to correct the offset caused due to optical-axis deviation (δ) in the radial tilt signal. The corrected radial tilt signal S' can be expressed by the following equation.

$$S' = G_L \times (L1 - L2 - L3 + L4) - G_R \times (R1 - R2 - R3 + R4) \qquad (3)$$

Incidentally, the tangential push-pull signal amplitudes $PT_R$ and $PT_L$ herein are determined by the operations on the hold values obtained by holding the respective peak-to-peak values of the signal amplitudes in the photo-detecting elements L1–L4 and R1–R4.

Figure 15:
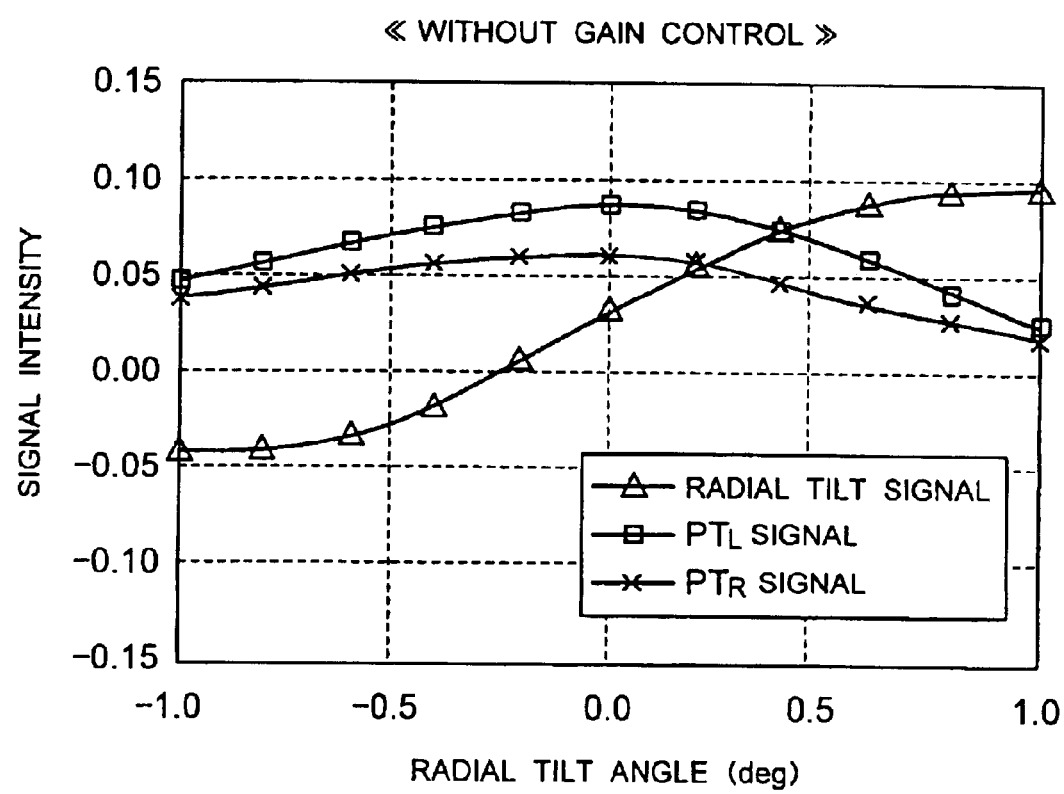
FIG. 15 is a figure showing a radial tilt signal intensity and a tangential push-pull signal amplitude against a radial tilt angle when gain control is not performed in the third embodiment of the invention.
Figure 16:
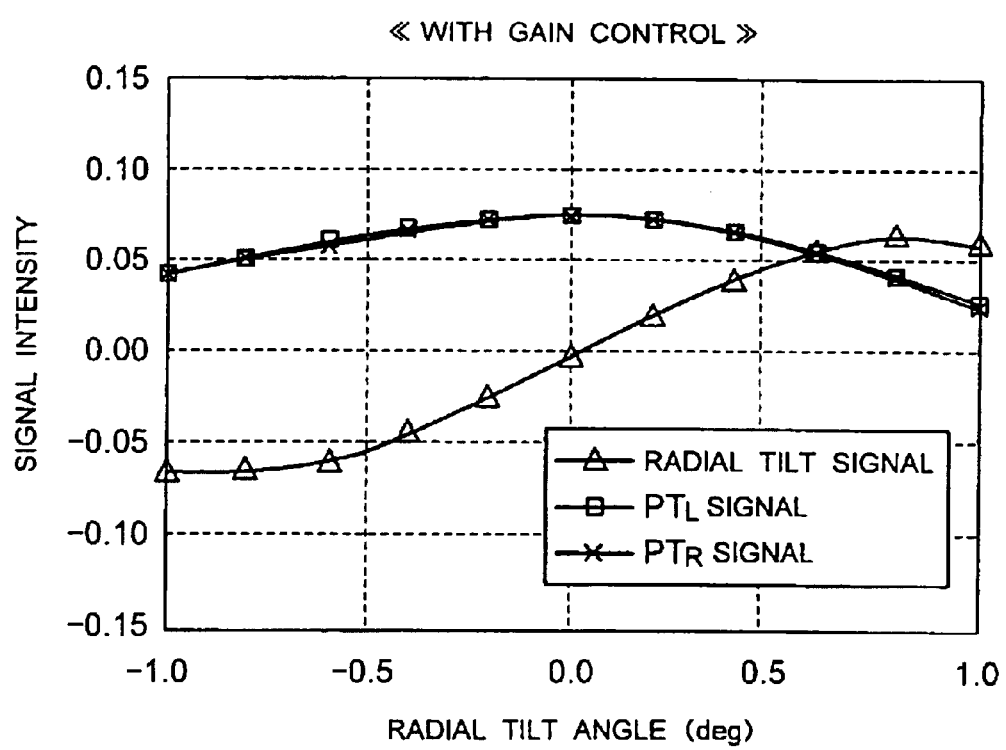
FIG. 16 is a figure showing a radial tilt signal intensity and a tangential push-pull signal amplitude against a radial tilt angle under gain control in the third embodiment of the invention.

The effect of the tilt detection by the present invention are shown in FIG. 15 and FIG. 16 for the cases without and with the gain control, respectively. Incidentally, the optical-axis deviation (δ) is assumed to be 6%. As shown in FIG. 15, the tangential push-pull signal amplitudes $PT_R$ and $PT_L$ are different causing offset in the radial tilt signal when no gain control is carried out. On the other hand, the offset in the radial tilt signal is corrected when gain control is implemented. Accordingly, it can be understood that favorable tilt servo control is feasible by using the corrected radial tilt signal S' which can be obtained in the foregoing method.

Other Embodiments

The foregoing third embodiment has been described with exemplification of using as the eight-element detector. However, a six-element detector for example may be used to make a tilt-signal generating process similar to that of the third embodiment, as shown in FIG. 17. In such a case, the corrected radial tilt signal S' representing a corrected radial tilt amount is expressed as $S'=G_L \times (L1-L2+L3)-G_R \times (R1-R2+R3)$ and the tangential push-pull signal amplitudes $PT_R$ and $PT_L$ are expressed as $PT_L=L1-L3$ and $PT_R=R1-R3$.

Figure 20:
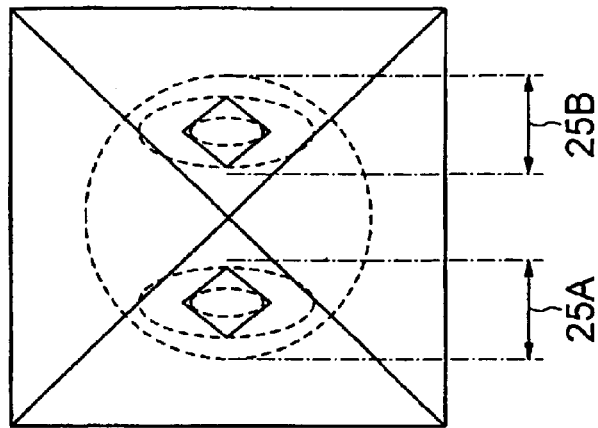
FIG. 20 is a figure showing an example of a modification of the detector division form according to the present invention.
Figure 19:
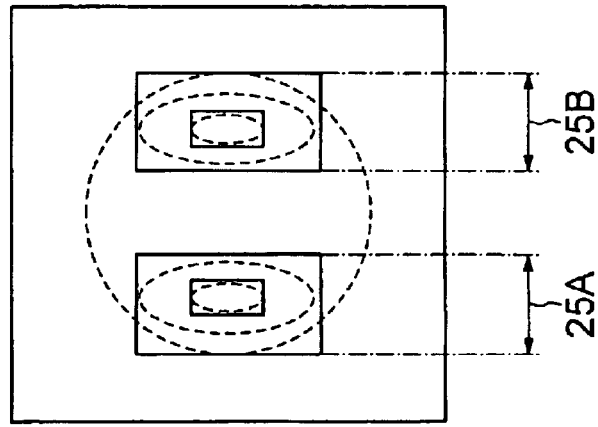
FIG. 19 is a figure showing an example of a modification of the detector division form according to the present invention.
Figure 18:
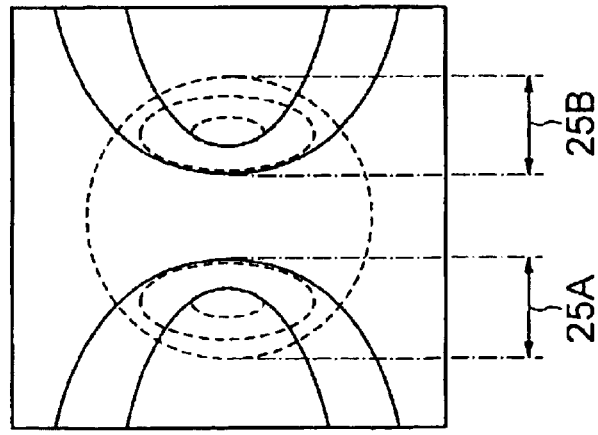
FIG. 18 is a figure showing an example of a modification of the detector division form according to the present invention.

Also, in the foregoing various embodiments, the detector division form may be arbitrary, provided that the detector is formed to detect a difference of light intensity in the interference portion of diffraction light at between the inner peripheral area and the outer peripheral area. For example, as shown in FIGS. 18, 19 and 20, the form may be in accordance with the light-intensity distribution in the inner and outer peripheral areas of the interference region. Incidentally, in the figures the broken line denotes a light intensity distribution and the solid line a divisional section.

Figure 21:
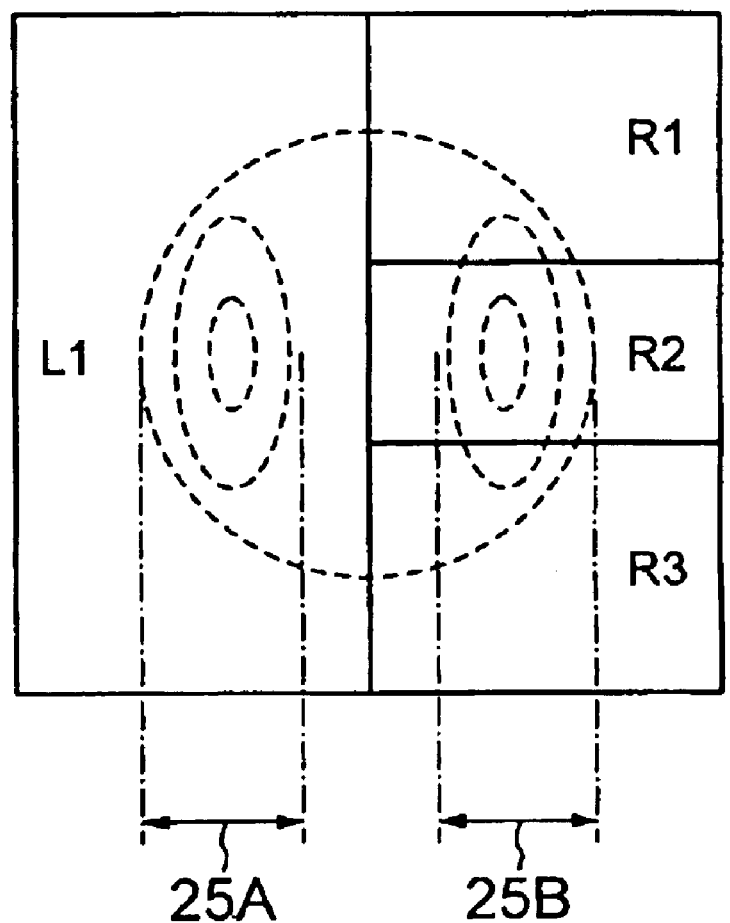
FIG. 21 is a figure showing an example of a modification of the division form of a detector for detecting a light intensity difference within one interference region according to the present invention.

The detector which detects a light intensity difference within at least one of the interference regions can be used. For example, a detector in which a detecting part corresponding to one interference region (one of those on the R and L sides) is divided as shown in FIG. 21 can be used.

Furthermore, although the foregoing embodiments have been described for the interference region of +1st order diffraction light and −1st order diffraction light, the invention is not limited to the case. It is possible to utilize a light intensity distribution in an interference region of 2nd or higher order diffraction lights.

Although in the foregoing embodiments have been shown the cases implementing tracking servo using the DPP signal, the similar effects can be achieved in the three-beam method or the usual push-pull method. Incidentally, the optical pickup may be of a one-beam configuration when using a typical push-pull method.

Also, the foregoing embodiment is merely an exemplification and a proper modification or combination can be applied in accordance with the kind of an optical recording medium, a pickup optical system and the like.

As described in detail in the above, the present invention is applicable to a disc regardless of the presence or absence of pre-pits provided that a groove or a pit train is provided. The present invention is applicable to any disc that a push-pull signal is available therefrom, e.g. a disc such as DVD-R, DVD-RW and DVD-RAM. The optical system of the pickup and the signal processing circuit, etc. are extremely simple because one-beam configuration is feasible in any of the discs.

As apparent from the foregoing, the present invention provides an optical pickup apparatus which has broad applicability to a variety of discs and optical systems. The present invention can be applied during data recording of a disc not having pre-pits. The present invention can be also applied to an optical pickup of a one-beam configuration. The present invention provides an optical pickup apparatus which is able to detect the tilt amount with high accuracy and is adapted for size reduction.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No.2000-237691 which is hereby incorporated by reference.

What is claimed is:

1. An optical pickup apparatus for illuminating a recording surface of a recording medium with a light beam to record and/or reproduce information, comprising:
   a photodetector for receiving a diffracted light reflected from said recording medium; and
   a tilt detector for detecting a tilt amount of said recording medium on the basis of a light intensity within an interference region of a 0th-order diffraction light and at least one diffraction light other than the 0th-order diffraction light of the reflected light received by said photodetector
   wherein said photodetector has three photo-detecting elements arranged in a tangential direction of said recording medium, a radial tilt signal S representing a radial tilt amount being expressed as $$S = L1 - L2 + L3$$

provided that reception signals by the photo-detecting elements are given by L1, L2 and L3 in order with respect to the tangential direction.

2. An optical pickup apparatus according to claim 1, wherein said at least one diffraction light includes one of a +1st order diffraction light and a −1st order diffraction light.

3. An optical pickup apparatus for illuminating a recording surface of a recording medium with a light beam to record and/or reproduce information, comprising:
   a photodetector for receiving a diffracted light reflected from said recording medium; and
   a tilt detector for detecting a tilt amount of said recording medium on the basis of a light intensity within an interference region of a 0th-order diffraction light and at least one diffraction light other than the 0th-order diffraction light of the reflected light received by said photodetector
   wherein said recording medium is a rotating recording medium and said tilt detector detects an amount of radial tilt on the basis of a light intensity within a diffraction light interference region in a radial direction of said recording medium.

4. An optical pickup apparatus according to claim 3, wherein said photodetector includes means for receiving the reflection light to generate a radial push-pull signal as a push-pull signal in the radial direction, and said tilt detector includes correcting means for calculating a corrected radial tilt amount by subtracting a value of the radial push-pull signal multiplied by a predetermined coefficient from a tilt signal intensity representing the radial tilt amount.

5. An optical pickup apparatus according to claim 3, wherein said photodetector includes means for receiving the reflection light to generate, with respect to the radial direction of said recording medium, at least two tangential push-pull signals as push-pull signals in a tangential direction of said recording medium, and said tilt detector includes correcting means for correcting a tilt signal representing the radial tilt amount such that amplitudes of said at least two tangential push-pull signals are made substantially equal.

6. An optical pickup apparatus according to claim 5, wherein said correcting means includes amplifying means for amplifying each of said tangential push-pull signals and an adjuster to adjust a gain of said amplifying means such that the amplitudes of said tangential push-pull signals are made substantially equal.

7. An optical pickup apparatus according to claim 3, wherein said recording medium comprises a recording region formed by land and groove portions.

8. An optical pickup apparatus according to claim 3, wherein said photodetector is a six-element detector having six photo-detecting elements arranged in the regions obtained by two-division in a radial direction of said recording medium and a further three-division in a tangential direction of said recording medium.

9. An optical pickup apparatus according to claim 8, wherein said photodetector is a six-element detector having six photo-detecting elements arranged in the regions obtained by two-division in the radial direction of said recording medium and a further three-division in the tangential direction of said recording medium, a radial tilt signal S representing the radial tilt amount being expressed as $$S = (L1 - L2 + L3) - (R1 - R2 + R3)$$

provided that reception signals by each pair of said photo-detecting elements opposed to in the radial direction of said recording medium are given by (L1, R1), (L2, R2) and (L3, R3) in an order with respect to the tangential direction.

10. An optical pickup apparatus according to claim 4, wherein said photodetector is a six-element detector having six photo-detecting elements arranged in the regions obtained by two-division in the radial direction of said recording medium and a further three-division in the tangential direction of said recording medium, and wherein a radial tilt signal S representing the radial tilt amount, a radial push-pull signal Pr and the corrected radial tilt signal S' representing the corrected radial tilt amount are expressed as $$S' = S - \alpha \times Pr$$

$$S = (L1 - L2 + L3) - (R1 - R2 + R3)$$

$$Pr = (L1 + L2 + L3) - (R1 + R2 + R3)$$

provided that reception-light signals by each set of said photo-detecting elements opposed to in the radial direction are given by (L1, L2, L3) and (R1, R2, R3) in order with respect to the tangential direction and the predetermined coefficient is given by $\alpha$.

11. An optical pickup apparatus according to claim 6, wherein said photodetector is a six-element detector having six photo-detecting elements arranged in the regions obtained by two-division in the radial direction of said recording medium and a further three-division in the tangential direction of said recording medium, said amplifying means including two amplifiers for amplifying reception-light signals by each set of said photo-detecting elements opposed to in the radial direction, and wherein the tangential push-pull signal amplitudes $PT_L$, $PT_R$ and the corrected radial tilt signal S' representing the corrected radial tilt amount are expressed as $$S' = G_L \times (L1 - L2 + L3) - G_R \times (R1 - R2 + R3)$$

$$PT_L = L1 - L3$$

$$PT_R = R1 - R3$$

$$G_L \times PT_L \approx G_R \times PT_R$$

provided that reception-light signals by each set of said photo-detecting elements opposed to in the radial direction are given by (L1, L2, L3) and (R1, R2, R3) in order with respect to the tangential direction, and the gains of said two amplifiers are given by $G_R$ and $G_L$.

12. An optical pickup apparatus according to claim 6, wherein said photodetector is an eight-element detector having eight photo-detecting elements arranged in the regions obtained by two-division in the radial direction of said recording medium and a further four-division in the tangential direction of said recording medium, said amplifying means including two amplifiers for amplifying reception-light signals by each set of said photo-detecting elements opposed to in the radial direction, and wherein the tangential push-pull signal amplitudes $PT_L$, $PT_R$ and the corrected radial tilt signal S' representing the corrected radial tilt amount are expressed as $$S'=G_L \times (L1-L2-L3+L4)-G_R \times (R1-R2-R3+R4)$$

$$PT_L=L1+L2-L3-L4$$

$$PT_R=R1+R2-R3-R4$$

$$G_L \times PT_L \approx G_R \times PT_R$$

provided that reception-light signals by each set of said photo-detecting elements opposed to in the radial direction are given by (L1, L2, L3, L4) and (R1, R2, R3, R4) in order with respect to the tangential direction, and the gains of said two amplifiers are given by $G_R$ and $G_L$.

13. A method of detecting a tilt amount of a recording medium for recording and/or reproducing information by illuminating a recording surface of said recording medium with a light beam, comprising the steps of:

receiving a diffracted light reflected from said recording medium; and generating a tilt signal representing a tilt amount of said recording medium on the basis of a light intensity within an interference region of a 0th-order diffraction light and at least one diffraction light other than the 0th-order diffraction light of the reflected light received in the step of receiving wherein said recording medium is a rotating recording medium and the step of generating a tilt signal representing a tilt amount of said recording medium generates a radial tilt signal on the basis of a light intensity within a diffraction light interference region in a radial direction of said recording medium.

14. A method according to claim 13, wherein the step of receiving includes the step of receiving the reflection light to generate a radial push-pull signal as a push-pull signal in the radial direction, and the step of generating a tilt signal includes the step of calculating a corrected radial tilt amount by subtracting a value of the radial push-pull signal multiplied by a predetermined coefficient from a tilt signal intensity representing the radial tilt amount.

15. A method according to claim 13, wherein the step of receiving includes the step of receiving the reflection light to generate, with respect to the radial direction of said recording medium, at least two tangential push-pull signals as push-pull signals in a tangential direction of said recording medium, and the step of generating a tilt signal includes the step of correcting a tilt signal representing the radial tilt amount such that amplitudes of said at least two tangential push-pull signals are made substantially equal.

* * * * *